US012639878B2

(12) United States Patent
Yeo et al.

(10) Patent No.: US 12,639,878 B2
(45) Date of Patent: May 26, 2026

(54) INSPECTION DEVICE AND INSPECTION METHOD

(71) Applicant: Samsung Display Co., LTD., Yongin-si (KR)

(72) Inventors: Min Kyu Yeo, Yongin-si (KR); Sun Woong Bae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 233 days.

(21) Appl. No.: 18/509,302

(22) Filed: Nov. 15, 2023

(65) Prior Publication Data

US 2024/0346740 A1 Oct. 17, 2024

(30) Foreign Application Priority Data

Apr. 12, 2023 (KR) ........................ 10-2023-0048199
Jun. 16, 2023 (KR) ........................ 10-2023-0077465

(51) Int. Cl.
| | |
|---|---|
| *G06T 15/00* | (2011.01) |
| *G06T 5/70* | (2024.01) |
| *G06T 7/62* | (2017.01) |
| *G06V 10/25* | (2022.01) |

(52) U.S. Cl.
CPC ................ *G06T 15/00* (2013.01); *G06T 5/70* (2024.01); *G06T 7/62* (2017.01); *G06V 10/25* (2022.01); *G06T 2207/20182* (2013.01)

(58) Field of Classification Search
CPC ..... G06T 7/001; G06T 7/0004; G06T 7/0006;

G06T 2207/20182; G06T 5/70; G06T 2207/30108; G06T 7/62; G03F 7/70608; G03F 1/70; G03F 7/70675
See application file for complete search history.

(56) References Cited

U.S. PATENT DOCUMENTS

| | | | |
|---|---|---|---|
| 6,633,831 | B2 | 10/2003 | Nikoonahad et al. |
| 6,673,637 | B2 | 1/2004 | Wack et al. |
| 6,757,645 | B2 | 6/2004 | Chang et al. |
| 6,782,337 | B2 | 8/2004 | Wack et al. |
| 6,806,951 | B2 | 10/2004 | Wack et al. |
| 6,891,610 | B2 | 5/2005 | Nikoonahad et al. |
| 6,917,419 | B2 | 7/2005 | Fielden et al. |
| 6,917,433 | B2 | 7/2005 | Levy et al. |

(Continued)

FOREIGN PATENT DOCUMENTS

| | | |
|---|---|---|
| JP | 2020-017096 | 1/2020 |
| JP | 2021-174969 | 11/2021 |

(Continued)

*Primary Examiner* — Hau H Nguyen
(74) *Attorney, Agent, or Firm* — CANTOR COLBURN LLP

(57) ABSTRACT

An inspection device comprises a virtual image generator configured to generate a virtual image based on a plurality of layers shown in a layout drawing, a reference measurement region determiner configured to determine a reference measurement region to be measured in the virtual image, a target measurement region detector configured to detect a target measurement region corresponding to the reference measurement region from a measurement target including a plurality of layers patterned based on the layout drawing, and a measurer configured to measure the target measurement region based on the reference measurement region.

20 Claims, 8 Drawing Sheets

(56)     References Cited

U.S. PATENT DOCUMENTS

| | | | |
|---|---|---|---|
| 6,919,957 | B2 | 7/2005 | Nikoonahad et al. |
| 6,946,394 | B2 | 9/2005 | Fielden et al. |
| 6,950,196 | B2 | 9/2005 | Fielden et al. |
| 7,006,235 | B2 | 2/2006 | Levy et al. |
| 7,130,029 | B2 | 10/2006 | Wack et al. |
| 7,139,083 | B2 | 11/2006 | Fielden et al. |
| 7,196,782 | B2 | 3/2007 | Fielden et al. |
| 7,523,027 | B2 | 4/2009 | Chang et al. |
| 7,570,796 | B2 | 8/2009 | Zafar et al. |
| 7,751,046 | B2 | 7/2010 | Levy et al. |
| 8,179,530 | B2 | 5/2012 | Levy et al. |
| 8,502,979 | B2 | 8/2013 | Levy et al. |
| 8,923,600 | B2 | 12/2014 | Zafar et al. |
| 8,988,658 | B2 | 3/2015 | Van De Kerkhof |
| 9,002,497 | B2 | 4/2015 | Volk et al. |
| 9,280,065 | B2 | 3/2016 | Van De Kerkhof |
| 11,355,306 | B2 | 6/2022 | Mack |
| 2012/0099781 | A1* | 4/2012 | Toyoda ................. G06T 7/0006 |
| | | | 382/145 |
| 2022/0244648 | A1* | 8/2022 | Sah ....................... G03F 7/7065 |
| 2022/0414833 | A1* | 12/2022 | Fukuda .................... G06T 5/70 |

FOREIGN PATENT DOCUMENTS

| | | |
|---|---|---|
| KR | 10-0604940 | 7/2006 |
| KR | 10-2015-0045783 | 4/2015 |
| KR | 10-2021-0118445 | 9/2021 |

* cited by examiner

INSPECTION DEVICE AND INSPECTION METHOD

CROSS REFERENCE TO RELATED APPLICATION(S)

This application claims priority to and benefits of Korean Patent Application No. 10-2023-0048199 filed on Apr. 12, 2023, and No. 10-2023-0077465 filed on Jun. 16, 2023, in the Korean Intellectual Property Office under 35 U.S.C. § 119, the contents of which are incorporated herein by reference in its entirety.

BACKGROUND

1. Technical Field

The disclosure relates to an inspection device and an inspection method.

2. Description of the Related Art

As information media such as a computer rapidly prevails, electronic devices or semiconductor devices are also drastically evolving. Fabrication technology for semiconductor devices is evolving so that integration, reliability, response time, etc. are improved. In accordance with such trends, each unit process is being developed to ensure a high yield, and at the same time, methods and devices for measuring process errors in each unit process are also being researched in order to enhance competitiveness in the semiconductor industry.

SUMMARY

Aspects of the disclosure provide an inspection device and an inspection method that can save the fabrication cost and time while ensuring reliability.

The technical objectives to be achieved by the disclosure are not limited to those described herein, and other technical objectives that are not mentioned herein would be clearly understood by a person skilled in the art from the description of the disclosure. According to an embodiment, an inspection device comprises a virtual image generator configured to generate a virtual image based on a plurality of layers shown in a layout drawing, a reference measurement region determiner configured to determine a reference measurement region to be measured in the virtual image, a target measurement region detector configured to detect a target measurement region corresponding to the reference measurement region from a measurement target including a plurality of layers patterned based on the layout drawing, and a measurer configured to measure the target measurement region based on the reference measurement region.

The virtual image generator may be configured to preprocess an image including the plurality of layers shown in the layout drawing to generate a preprocessed image, capture an image of a plurality of layers stacked based on the layout drawing to acquire an actually captured image, and generate a first virtual image based on the preprocessed image and the actually captured image.

The virtual image generator may be configured to generate the first virtual image by adjusting a loss of the preprocessed image and a loss of the actually captured image so that a loss of the first virtual image is reduced as expressed in Equation below:

$$L = \alpha L_1 + \beta L_2 \qquad \text{[Equation]}$$

wherein L denotes the loss of the first virtual image, a denotes a weight of the preprocessed image, $L_1$ denotes the loss of the preprocessed image, p denotes a weight of the actually captured image, and $L_2$ denotes the loss of the actually captured image.

The target measurement region detector may be configured to detect a target measurement region corresponding to a reference measurement region of the first virtual image from a measurement target in which a photoresist is developed.

The virtual image generator may be configured to extract two-dimensional images by separating the plurality of layers shown in the layout drawing from one another, integrate the two-dimensional images to sort the integrated two-dimensional images by types of different overlapping layers, and conduct image mapping on each of the different overlapping layers, to generate a second virtual image.

The virtual image generator may be configured to generate the second virtual image by performing the image mapping and then conducting a blurring processing for each of the different overlapping layers.

The target measurement region detector may be configured to detect a target measurement region corresponding to a reference measurement region of the second virtual image from a measurement target after the target measurement region has been etched using a developed photoresist and the photoresist has been cleaned.

The target measurement region detector may be configured to perform pattern matching of the measurement target based on the reference measurement region to detect the target measurement region that satisfies a degree of matching.

The measurer may be configured to conduct pattern measurement on at least one of overlay, refractive index and thickness based on the reference measurement region to measure a line width, a hole, and/or area of the target measurement region.

The target measurement region detector may be configured to remove noise from an actually captured image of the measurement target, and detect a target measurement region corresponding to the reference measurement region from the actually captured image after the noise has been removed.

According to an embodiment, an inspection method comprises generating a virtual image based on a plurality of layers shown in a layout drawing, determining a reference measurement region to be measured in the virtual image, detecting a target measurement region corresponding to the reference measurement region from a measurement target including a plurality of layers patterned based on the layout drawing, and measuring the target measurement region based on the reference measurement region.

The generating of the virtual image may comprise preprocessing an image including the plurality of layers shown in the layout drawing to generate a preprocessed image, capturing an image of a plurality of layers stacked based on the layout drawing to acquire an actually captured image, and generating a first virtual image based on the preprocessed image and the actually captured image.

The generating of the virtual image may comprise generating the first virtual image by adjusting a loss of the preprocessed image and a loss of the actually captured image so that a loss of the first virtual image is reduced as expressed in Equation below:

$$L = \alpha L_1 + \beta L_2 \qquad \text{[Equation]}$$

wherein L denotes the loss of the first virtual image, a denotes a weight of the preprocessed image, $L_1$ denotes the loss of the preprocessed image, p denotes a weight of the actually captured image, and $L_2$ denotes the loss of the actually captured image.

The detecting of the target measurement region may comprise detecting a target measurement region corresponding to a reference measurement region of the first virtual image from a measurement target in which a photoresist is developed.

The generating of the virtual image may comprise extracting two-dimensional images by separating the plurality of layers shown in the layout drawing from one another, integrating the two-dimensional images to sort the integrated two-dimensional images by types of different overlapping layers, and conducting image mapping on each of the different overlapping layers, to generate a second virtual image.

The generating of the virtual image may comprise generating the second virtual image by performing the image mapping and then conducting a blurring process for each of the different overlapping layers.

The detecting of the target measurement region may comprise detecting a target measurement region corresponding to a reference measurement region of the second virtual image from a measurement target after the target measurement region has been etched by using a developed photoresist and the developed photoresist has been cleaned.

The detecting of the target measurement region may comprise performing pattern matching of the measurement target based on the reference measurement region to detect the target measurement region that satisfies a degree of matching.

The measuring of the target measurement region may comprise conducting pattern measurement on at least one of overlay, refractive index and thickness based on the reference measurement region to measure a line width, a hole, and/or area of the target measurement region.

The detecting of the target measurement region may comprise removing noise from an actually captured image of the measurement target, and detecting a target measurement region corresponding to the reference measurement region from the actually captured image after the noise has been removed.

According to the embodiments of the disclosure, generating a virtual image to determine a reference measurement region can be completed prior to measurement, and after-development inspection (ADI) and after-cleaning inspection (ACI) can be repeated for each layer during fabrication processes. Accordingly, the inspection device and the inspection method can save the fabrication cost and time while ensuring reliability.

It should be noted that effects of the disclosure are not limited to those described above and other effects of the disclosure will be apparent to those skilled in the art from the following descriptions.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
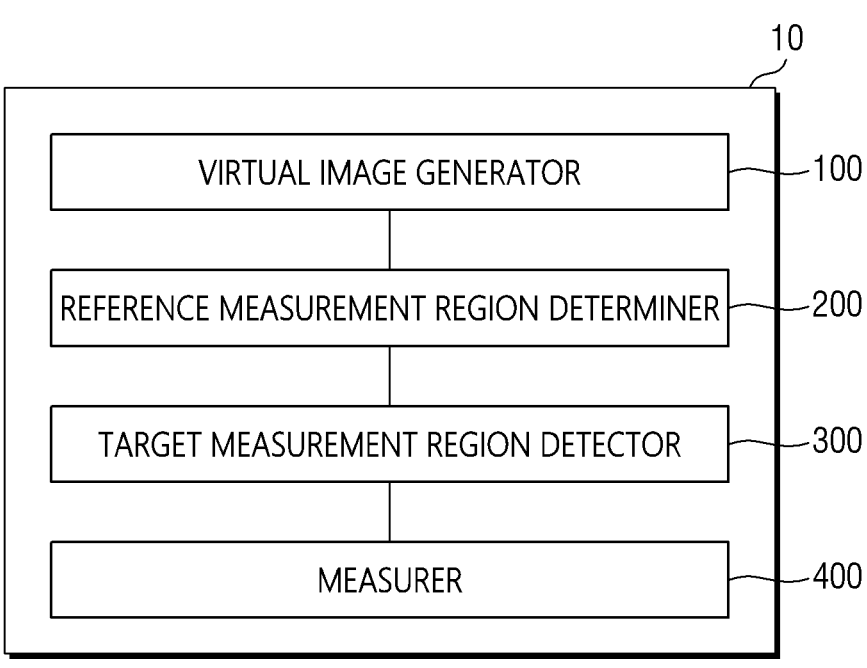
FIG. 1 is a schematic block diagram for illustrating an inspection device according to an embodiment of the disclosure.

In the following description, for the purposes of explanation, numerous specific details are set forth in order to provide a thorough understanding of various embodiments or implementations of the disclosure. As used herein "embodiments" and "implementations" are interchangeable words that are non-limiting examples of devices or methods employing one or more of the disclosure disclosed herein. It is apparent, however, that various embodiments may be practiced without these specific details or with one or more equivalent arrangements. In other instances, structures and devices are shown in block diagram form in order to avoid unnecessarily obscuring various embodiments. Further, various embodiments may be different, but do not have to be exclusive nor limit the disclosure. For example, specific shapes, configurations, and characteristics of an embodiment may be used or implemented in other embodiments without departing from the disclosure.

Unless otherwise specified, the illustrated embodiments are to be understood as providing features of varying detail of some ways in which the disclosure may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the disclosure.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

Further, the X-axis, the Y-axis, and the Z-axis are not limited to three axes of a rectangular coordinate system, and thus the X-, Y-, and Z-axes, and may be interpreted in a broader sense. For example, the X-axis, the Y-axis, and the Z-axis may be perpendicular to one another, or may represent different directions that are not perpendicular to one another.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, ZZ, or the like. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein should be interpreted accordingly.

The terminology used herein is for the purpose of describing particular embodiments and is not intended to be limiting. As used herein, the singular forms, such as "a" and "an," are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature, and the shapes of these regions may not reflect actual shapes of regions of a device and, as such, are not necessarily intended to be limiting.

As customary in the field, some embodiments are described and illustrated in the accompanying drawings in terms of functional blocks, units, parts, and/or modules. Those skilled in the art will appreciate that these blocks, units, parts, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, parts, and/or modules being implemented by microprocessors or other similar hardware, they may be programmed and controlled using software (e.g., microcode) to perform various functions discussed herein and may optionally be driven by firmware and/or software. It is also contemplated that each block, unit, part, and/or module may be implemented by dedicated hardware, or as a combination of dedicated hardware to perform some functions and a processor (e.g., one or more programmed microprocessors and associated circuitry) to perform other functions. Also, each block, unit, part, and/or module of some embodiments may be physically separated into two or more interacting and discrete blocks, units, parts, and/or modules without departing from the scope of the disclosure. Further, the blocks, units, parts, and/or modules of some embodiments may be physically combined into more complex blocks, units, parts, and/or modules without departing from the scope of the disclosure.

Unless otherwise defined or implied herein, all terms (including technical and scientific terms) used herein have the same meaning as commonly understood by those skilled in the art to which this disclosure pertains. It will be further understood that terms, such as those defined in commonly used dictionaries, should be interpreted as having a meaning that is consistent with their meaning in the context of the relevant art and the disclosure, and should not be interpreted in an ideal or excessively formal sense unless clearly so defined herein.

Hereinafter, detailed embodiments of the disclosure is described with reference to the accompanying drawings.

Figure 2:
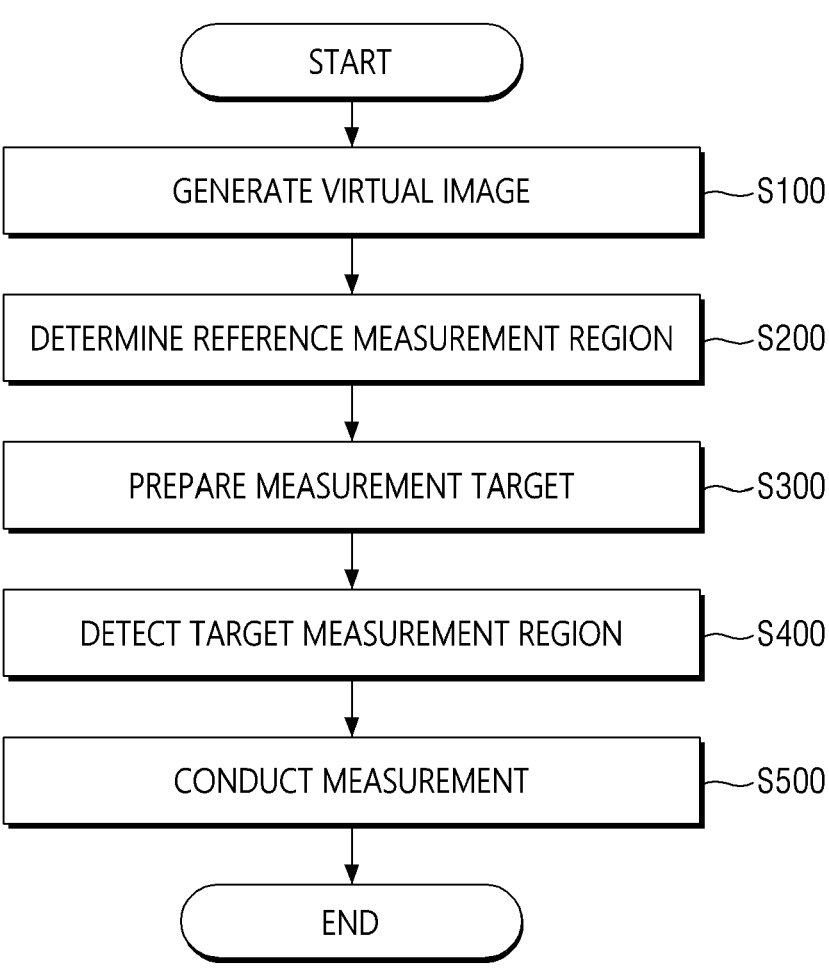
FIG. 2 is a schematic flowchart for illustrating inspection processes according to an embodiment of the disclosure.

FIG. 1 is a schematic block diagram for illustrating an inspection device according to an embodiment of the disclosure. FIG. 2 is a schematic flowchart for illustrating inspection processes according to an embodiment of the disclosure.

Referring to FIGS. 1 and 2, an inspection device 10 may measure patterning results during photomask-based fabrication processes. The inspection device 10 may predict patterning results during processes of fabricating an electronic device, a semiconductor device, or a battery. For example, an electronic device or a semiconductor device may be a mobile phone, a smart phone, a tablet PC, a mobile communications terminal, an electronic notebook, an electronic book, a portable multimedia player (PMP), a navigation device, and an ultra mobile PC (UMPC). As another example, the electronic device or the semiconductor device may be used as a display unit of a television, a laptop computer, a monitor, an electronic billboard, or the Internet of Things (IoT). As yet another example, the electronic device or the semiconductor device may be wearable devices such as a smart watch, a watch phone, a glasses-type display, and a head-mounted display (HMD) device.

The inspection device 10 may include a virtual image generator 100, a reference measurement region determiner 200, a target measurement region detector 300, and/or a measurer 400.

The virtual image generator 100 may generate a virtual image based on at least one layer shown in a layout drawing (step S100). The layout drawing may include a layout view of each of multiple layers. The virtual image generator 100 may generate virtual images in the order that the multiple layers are sequentially stacked. The multiple layers may include at least one metal layer and/or at least one organic layer. For example, the virtual image generator 100 may generate a virtual image including a first layer, a virtual image including first and second layers, and a virtual image including first to third layers. Accordingly, the virtual image generator 100 may generate virtual images based on a layout drawing without a real object in which at least one layer is actually stacked.

The reference measurement region determiner 200 may determine a reference measurement region in the virtual image to measure it (step S200). The reference measurement region determiner 200 may receive multiple virtual images from the virtual image generator 100 and may determine a reference measurement region for each of the multiple virtual images. The reference measurement region determiner 200 may determine multiple reference measurement regions per virtual image. For example, the reference measurement region determiner 200 may determine the reference measurement region by receiving a user's input, but the disclosure is not limited thereto. The reference measurement region may include at least one region defined by at least one metal line, at least one hole, and/or a layer.

A measurement target may include at least one layer patterned based on the layout drawing, and may be prepared for measurement (step S300). The measurement target may be prepared during processes of fabricating an electronic device or semiconductor device.

The target measurement region detector 300 may capture an image of the measurement target and may detect a target measurement region corresponding to the reference measurement region from the measurement target (step S400). The target measurement region detector 300 may perform pattern matching of the measurement target based on the reference measurement region, and may detect a target measurement region that satisfies a degree of matching (e.g., a predetermined or selectable degree of matching). In an embodiment, the degree of matching of the pattern may be a numerical value that represents the similarity between the reference measurement region and the target measurement region. For example, the target measurement region detector 300 may detect the target measurement region in case that the degree of matching of the pattern is equal to or greater than 85%. It should be understood, however, that the criterion of the degree of matching is not limited thereto.

The measurer 400 may measure the target measurement region based on the reference measurement region (step S500). The measurer 400 may measure the size of a line width, the position of a hole, and the shape and size of the target measurement region. The measurer 400 may conduct critical dimension measurement based on the reference measurement region. For example, the measurer 400 may conduct pattern measurement on at least one of overlay, refractive index, and thickness based on the reference measurement region to measure the line width, the hole, and/or area of the target measurement region. The measurer 400 may measure overlay of the patterns to measure the misalignment of the lines.

In case that the measurement target satisfies the measurement criterion, the processes of fabricating electronic devices or semiconductor devices may continue. The inspection device 10 may measure the measurement target again in case that the fabrication processes further proceed. Therefore, the inspection device 10 can measure all patterning results during the fabrication processes, and can ensure the reliability of the measurement target.

In case that the measurement target does not satisfy the measurement criterion, subsequent fabrication processes for the measurement target may be interrupted.

Figure 3:
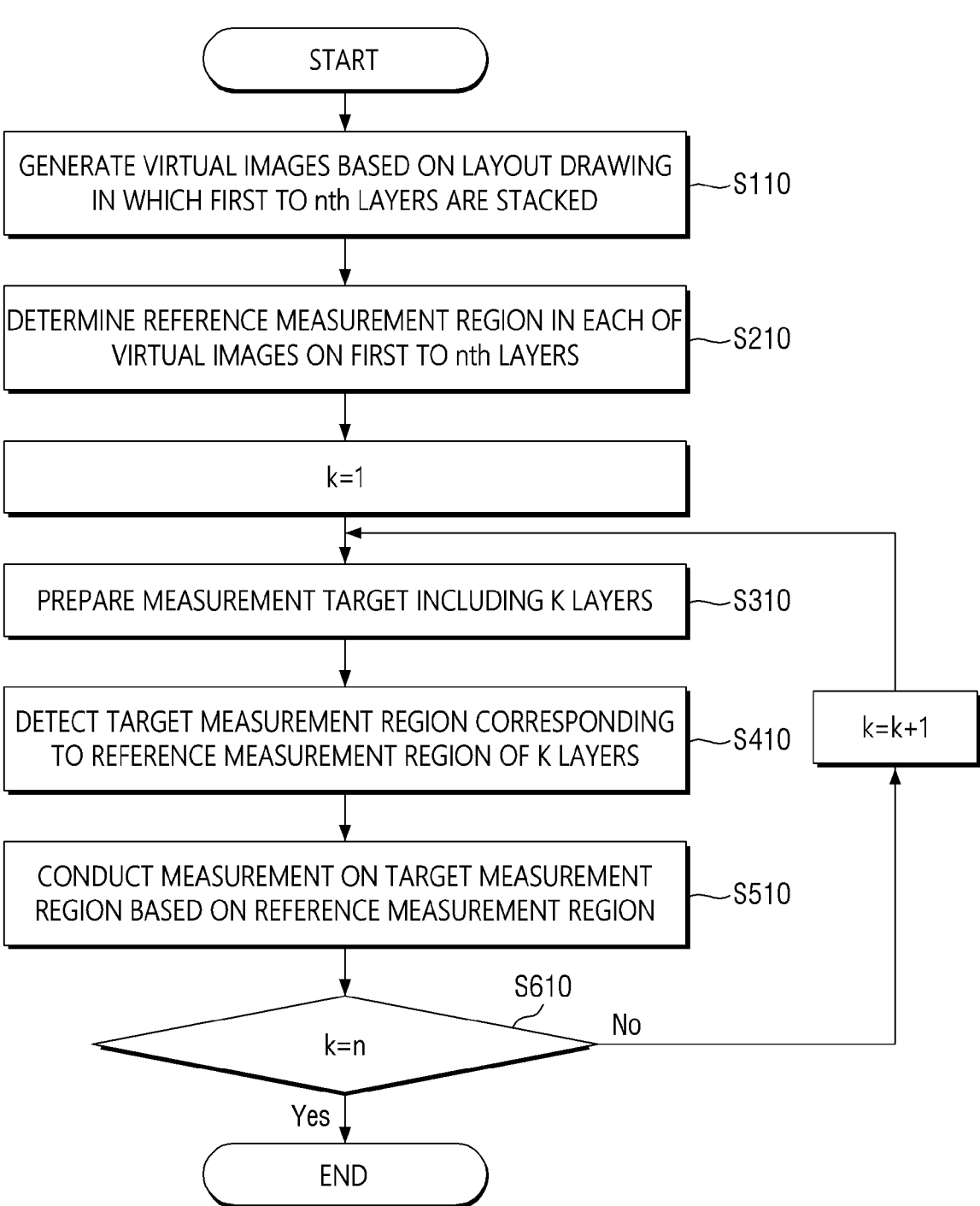
FIG. 3 is a schematic flowchart for illustrating inspection processes according to another embodiment of the disclosure.

FIG. 3 is a schematic flowchart for illustrating inspection processes according to another embodiment of the disclosure.

Referring to FIG. 3, the virtual image generator 100 may generate virtual images for the first to $n^{th}$ layers, respectively, shown in the layout drawing (step S110). The layout drawing may include a layout view of each of the first to $n^{th}$ layers. The virtual image generator 100 may generate virtual images in the order that the layers are sequentially stacked. For example, the virtual image generator 100 may generate a virtual image including a first layer to a virtual image including the first to $n^{th}$ layers. Accordingly, the virtual image generator 100 may generate virtual images based on the layout drawing without a real object in which the first to $n^{th}$ layers are actually stacked.

The reference measurement region determiner 200 may determine a reference measurement region in each of the virtual images of the first to $n^{th}$ layers to be measured (step S210). The reference measurement region determiner 200 may receive multiple virtual images from the virtual image generator 100 and may determine a reference measurement region for each of the multiple virtual images. The reference measurement region determiner 200 may determine multiple reference measurement regions per virtual image. For example, the reference measurement region determiner 200 may determine the reference measurement region by receiving a user's input, but the disclosure is not limited thereto. The reference measurement region may include at least one region defined by at least one metal line, at least one hole, and/or a layer.

A measurement target may include the k layers patterned based on the layout drawing, and may be prepared for measurement (step S310), where k is an integer in a range of one to n. The measurement target may be prepared during processes of fabricating an electronic device or semiconductor device.

The target measurement region detector 300 may capture an image of the measurement target including the k layers and may detect a target measurement region of the measurement target that corresponds to the reference measurement region (step S410). The target measurement region detector 300 may perform pattern matching of the measurement target based on the reference measurement region, and may detect a target measurement region that satisfies a degree of matching (e.g., a predetermined or selectable degree of matching). In an embodiment, the degree of matching of the pattern may be a numerical value that represents the similarity between the reference measurement region and the target measurement region. For example, the target measurement region detector 300 may detect the target measurement region in case that the degree of matching of the pattern is equal to or greater than 85%. It should be understood, however, that the criterion of the degree of matching is not limited thereto.

The measurer 400 may measure the target measurement region based on the reference measurement region (step S500). The measurer 400 may measure the size of a line width, the position of a hole, and/or the shape and size of the target measurement region. The measurer 400 may conduct critical dimension measurement based on the reference measurement region. For example, the measurer 400 may conduct pattern measurement on at least one of overlay, refractive index, and thickness based on the reference measurement region to measure the line width, the hole, and/or area of the target measurement region. The measurer 400 may measure overlay of the patterns to measure the misalignment of the lines.

In case that the measurement target including the k layers satisfies the measurement criterion, the processes of fabricating electronic devices or semiconductor devices may continue. For example, in case that the measurement target including the first layer satisfies the measurement criterion, the measurement target may additionally have a second layer stacked thereon, and the inspection device 10 may conduct measurement on the measurement target including the first and second layers. In case that the measurement target including the first layer and the second layer satisfies the measurement criterion, the measurement target may additionally have a third layer stacked thereon, and the inspection device 10 may conduct measurement on the measurement target including the first to third layers. In this manner, the inspection device 10 may perform measurement up to a measurement target including the first to $n^{th}$ layers. Therefore, the inspection device 10 can measure all patterning results during the fabrication processes, and can ensure the reliability of the measurement target.

The inspection device 10 can acquire virtual images in advance based on the layout drawing, and may eliminate (or may not require) a process of setting a reference measurement region by capturing a real object in which the layers are actually stacked whenever a process proceeds. Accordingly, the inspection device 10 may complete the generating of the virtual image S110 and the determining of the reference measurement region S210 before measurement is performed, and may repeat only the preparing of the measurement target S310, the detecting of the target measurement region S410, and the conducting of the measurement S510 as the fabrication processes proceed. The repeating S610 of steps S310, S410, and S510 may continue until k is equal to n, with k increased by 1 per repetition. Accordingly, the inspection device 10 can save the fabrication cost and time while ensuring reliability.

Figure 4:
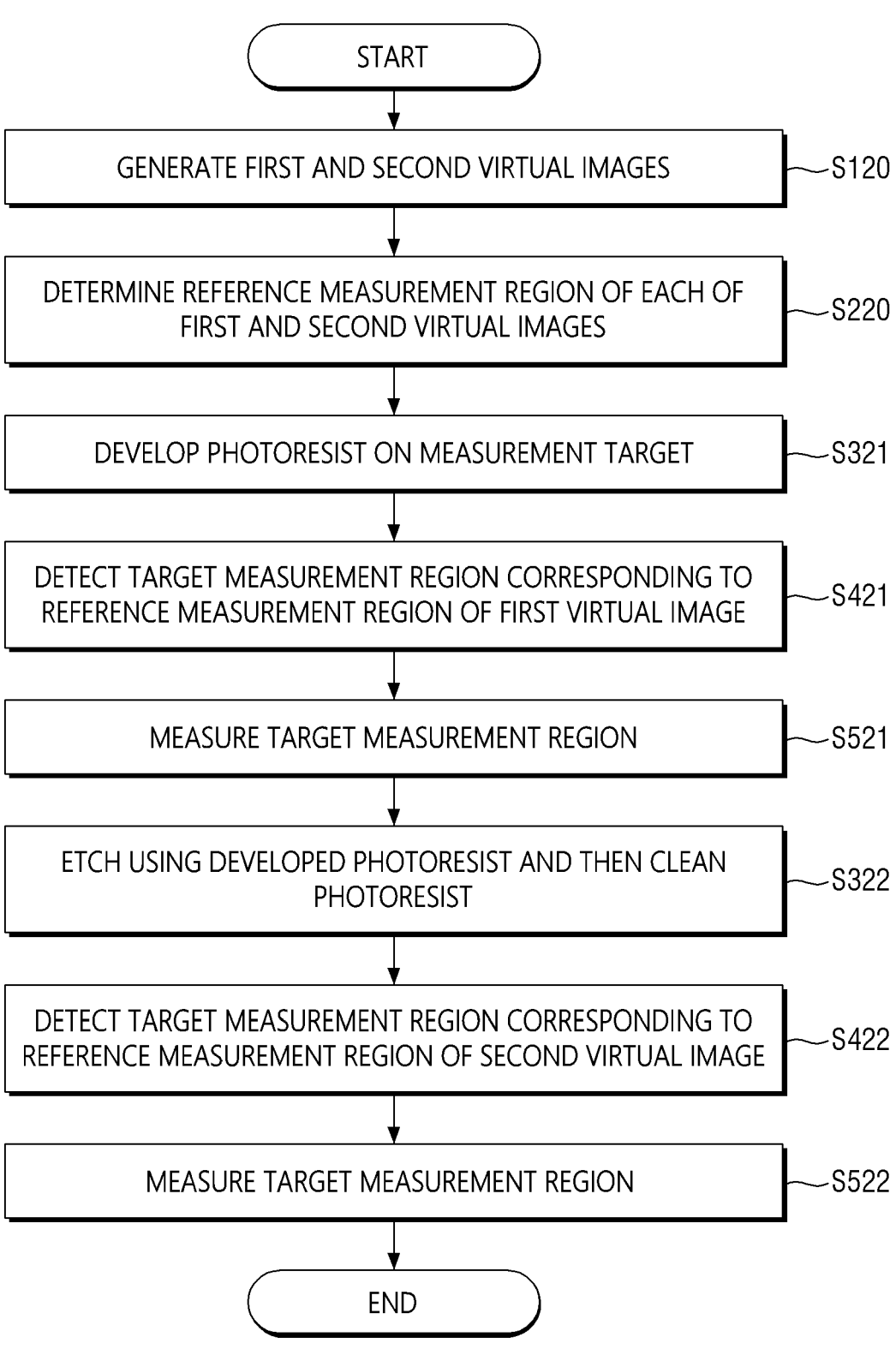
FIG. 4 is a schematic flowchart for illustrating inspection processes according to yet another embodiment of the disclosure.

FIG. 4 is a schematic flowchart for illustrating inspection processes according to yet another embodiment of the disclosure.

Referring to FIG. 4, the virtual image generator 100 may generate first and second virtual images based on at least one layer shown in the layout drawing (step S120). The layout drawing may include a layout view of each of multiple layers. The virtual image generator 100 may generate virtual images in the order that multiple layers are sequentially stacked. The multiple layers may include at least one metal layer and/or at least one organic layer. For example, the first virtual image may be used for after-development inspection (ADI). The after-development inspection (ADI) may measure a measurement target in which photoresist is developed on at least one layer. Accordingly, the virtual image generator 100 may generate the first virtual image based on the layout drawing without a real object in which the photoresist is actually stacked.

For example, the second virtual image may be used for after-cleaning inspection (ACI). The after-cleaning inspection (ACI) may be carried out after the measurement target is etched by using the developed photoresist and then the photoresist disposed on the measurement target is cleaned. Accordingly, the virtual image generator 100 may generate the second virtual image based on the layout drawing without a real object that is etched and cleaned.

The reference measurement region determiner 200 may determine a reference measurement region of each of the first and second virtual images (step S220). The reference measurement region determiner 200 may receive multiple first virtual images and multiple second virtual images from the virtual image generator 100, and may determine a reference measurement region on each of the first virtual images and a reference measurement region on each of the second virtual images.

The measurement target may include the developed photoresist based on the layout drawing and may be prepared for measurement (step S321). The photoresist may be patterned on a layer to be etched.

The target measurement region detector 300 may capture an image of the measurement target and may detect a target measurement region of the first virtual image that corresponds to the reference measurement region from the measurement target (step S421). The target measurement region detector 300 may perform pattern matching of the measurement target based on the reference measurement region, and may detect a target measurement region that satisfies a degree of matching (e.g., a predetermined or selectable degree of matching).

The measurer 400 may measure the target measurement region based on the reference measurement region of the first virtual image (step S521). The measurer 400 may conduct after-development inspection (ADI) based on the first virtual image. Accordingly, the measurer 400 may determine whether photoresist is properly developed on the measurement target.

In case that the measurement target satisfies the measurement criterion, the processes of fabricating electronic devices or semiconductor devices may continue. The measurement target may be etched using the developed photoresist, and the photoresist disposed on the measurement target may be cleaned to prepare for measurement (step S322). Accordingly, the measurement target may include a patterned layer.

The target measurement region detector 300 may capture an image of the measurement target and may detect a target measurement region of the second virtual image that corresponds to the reference measurement region from the measurement target (step S422). The target measurement region detector 300 may perform pattern matching of the measurement target based on the reference measurement region, and may detect a target measurement region that satisfies a degree of matching (e.g., a predetermined or selectable degree of matching).

The measurer 400 may measure the target measurement region based on the reference measurement region of the second virtual image (step S522). The measurer 400 may conduct after-cleaning inspection (ACI) based on the second virtual image. Accordingly, the measurer 400 may determine whether a layer is properly patterned on the measurement target.

The inspection device 10 can acquire in advance the first virtual images for the after-development inspection (ADI) and the second virtual images for the after-cleaning inspection (ACI) based on the layout drawing, and may not require a process of setting a reference measurement region by capturing a real measurement target whenever a process proceeds. Accordingly, the inspection device 10 may complete the generating of the first and second virtual images (step S120) and the determining of the reference measurement region (step S220) prior to the measurement is conducted, and the after-development inspection (ADI) and the after-cleaning inspection (ACI) for each layer may be repeated as the fabrication processes proceed. Accordingly, the inspection device 10 can save the fabrication cost and time while ensuring reliability.

Figure 5:
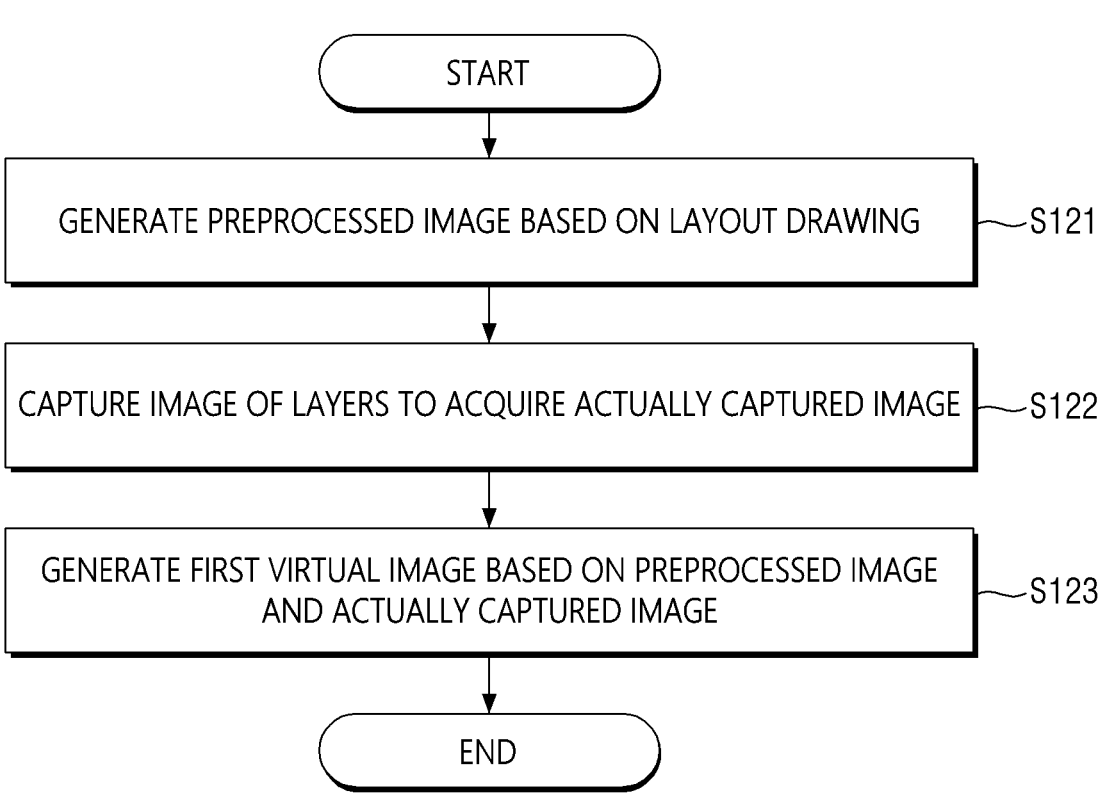
FIG. 5 is a schematic flowchart illustrating a process of generating a first virtual image in inspection processes according to an embodiment.

FIG. 5 is a schematic flowchart illustrating a process of generating a first virtual image in inspection processes according to an embodiment.

Referring to FIG. 5, the virtual image generator 100 may generate a preprocessed image based on at least one layer drawn in a layout drawing (step S121). The layout drawing may include a layout view including multiple layers, and the multiple layers may be expressed as overlapping lines. The multiple layers may include at least one metal layer and/or at least one organic layer. The virtual image generator 100 may generate a preprocessed image by adding a style of a captured image to the layout drawing. Herein, the style of the captured image may express the texture of the actual captured image resulting from the geometric structure of the captured object. Accordingly, the virtual image generator 100 may generate the preprocessed image similar to the actual captured image.

The virtual image generator 100 may acquire an actually captured image by capturing multiple layers stacked based on the layout drawing (step S122). For example, the virtual image generator 100 may acquire the actually captured image in advance before conducting measurement, but the disclosure is not limited thereto.

The virtual image generator 100 may generate a first virtual image based on the preprocessed image and the actually captured image (step S123). The virtual image generator 100 may generate a first virtual image capable of reducing loss by using a pre-trained convolutional neural network. For example, the virtual image generator 100 may generate the first virtual image using the following equation:

$$L = \alpha L_1 + \beta L_2 \qquad \langle \text{Equation 1} \rangle$$

where L denotes the loss of the first virtual image, a denotes the weight of the preprocessed image, $L_1$ denotes the loss of the preprocessed image, p denotes the weight of the actually captured image, and $L_2$ denotes the loss of the actually captured image.

The virtual image generator 100 may determine a weight (α) of the preprocessed image and a weight (β) of the actually captured image that can reduce the loss of the first virtual image. Accordingly, the virtual image generator 100 may generate a first virtual image used for after-development inspection (ADI) by applying the style of the actually captured image to the preprocessed image generated based on the layout drawing.

Figure 6:
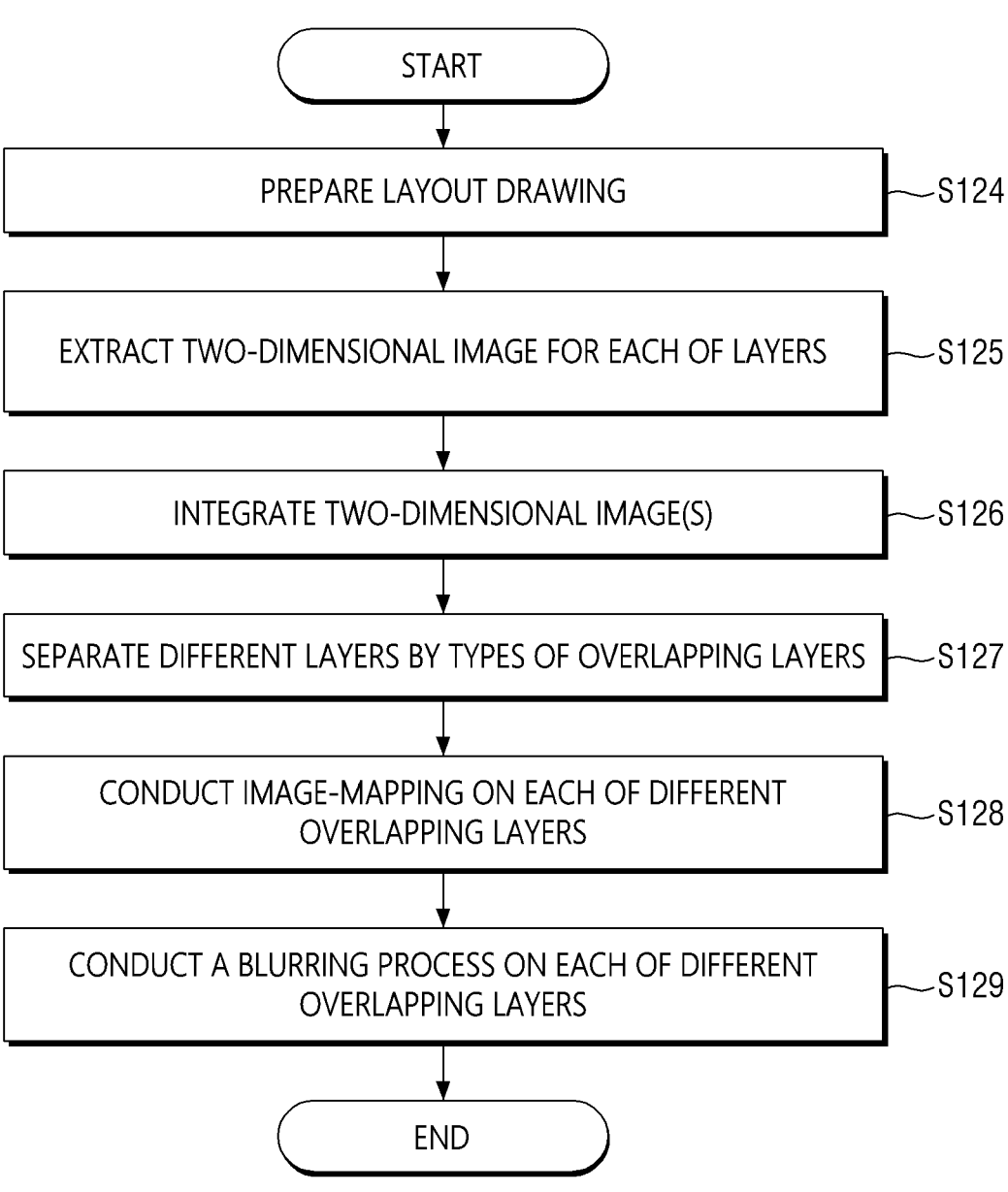
FIG. 6 is a schematic flowchart illustrating a process of generating a second virtual image in inspection processes according to an embodiment.

FIG. 6 is a schematic flowchart illustrating a process of generating a second virtual image in inspection processes according to an embodiment.

Referring to FIG. 6, the virtual image generator 100 may prepare a layout drawing including multiple layers (step S124). The layout drawing may include overlapping lines to express multiple layers. The multiple layers may include at least one metal layer and/or at least one organic layer.

The virtual image generator 100 may extract a two-dimensional image from each of the layers (step S125). The virtual image generator 100 may add colors to the separated layers. The two-dimensional image may represent a pattern for each layer. The multiple layers may be expressed in different colors.

The virtual image generator 100 may integrate (or combine) two-dimensional image(s) (step S126). The two-dimensional image(s) at this step may not express the overlapping of the multiple layers.

The virtual image generator 100 may express different overlapping layers in different colors based on the types of the layers (step S127). The virtual image generator 100 may recognize the types of the overlapping layers based on the lines and the colors.

The virtual image generator 100 may recognize the types of overlapping layers based on the lines and the regions of the layers, and may perform image mapping for each of the different overlapping layers (step S128). For example, the virtual image generator 100 may conduct image mapping on each of a first region in which an active layer and a gate layer are stacked, a second region in which a gate layer and a source metal layer are stacked, a third region in which an active layer, a gate layer and a source metal layer are stacked, and a fourth region in which an active layer and a source metal layer are stacked.

The virtual image generator 100 may conduct a blurring or a blurring process for each of the different overlapping layers (step S129). Since the layers are actually stacked and include a geometric structure, focusing may be affected by the geometric structure if they are directly captured. Accordingly, the virtual image generator 100 may generate a second virtual image used for after-cleaning inspection (ACI) by conducting a blurring process to apply an actual change in focusing.

Figure 7:
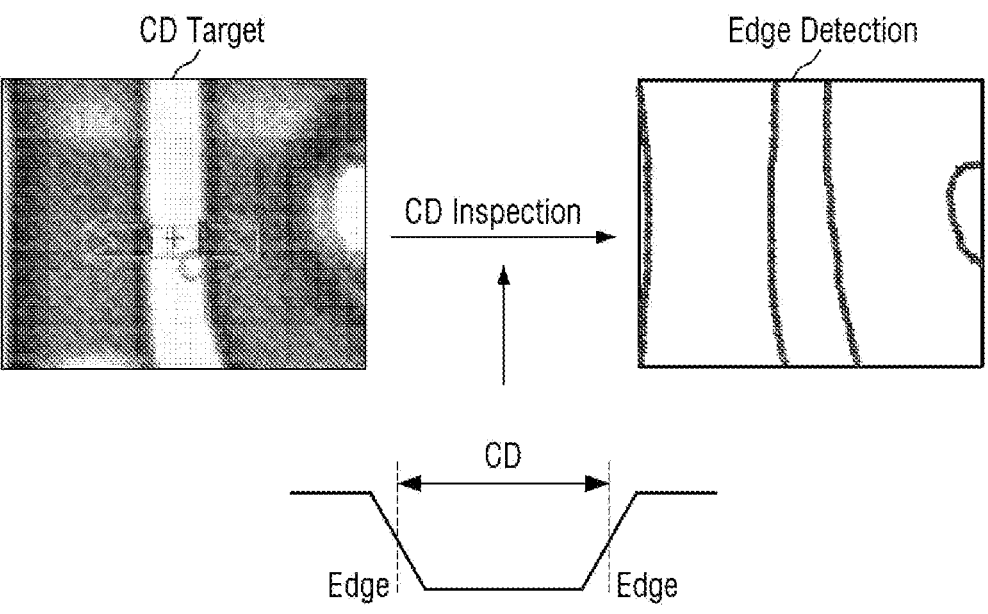
FIG. 7 is a view showing a process of inspecting a measurement target region during inspection processes according to an embodiment.

FIG. 7 is a schematic view showing a process of inspecting a measurement target region during inspection processes according to an embodiment.

Referring to FIG. 7, the measurer 400 may measure a target measurement region based on a reference measurement region. The measurer 400 may measure the size of a line width of a CD target, the position of a hole, and/or the shape and size of the target measurement region. The measurer 400 may conduct critical dimension (CD) inspection based on the reference measurement region. To conduct CD inspection, edges of layers may be detected, and measurements may be performed based on the edges of the layers. For example, the measurer 400 may conduct pattern measurement on at least one of overlay, refractive index, and thickness based on the reference measurement region. The measurer 400 may measure overlay of the patterns to measure the misalignment of the lines. Accordingly, the measurer 400 may measure the line width of the CD target, the hole, and/or the region.

Figure 8:
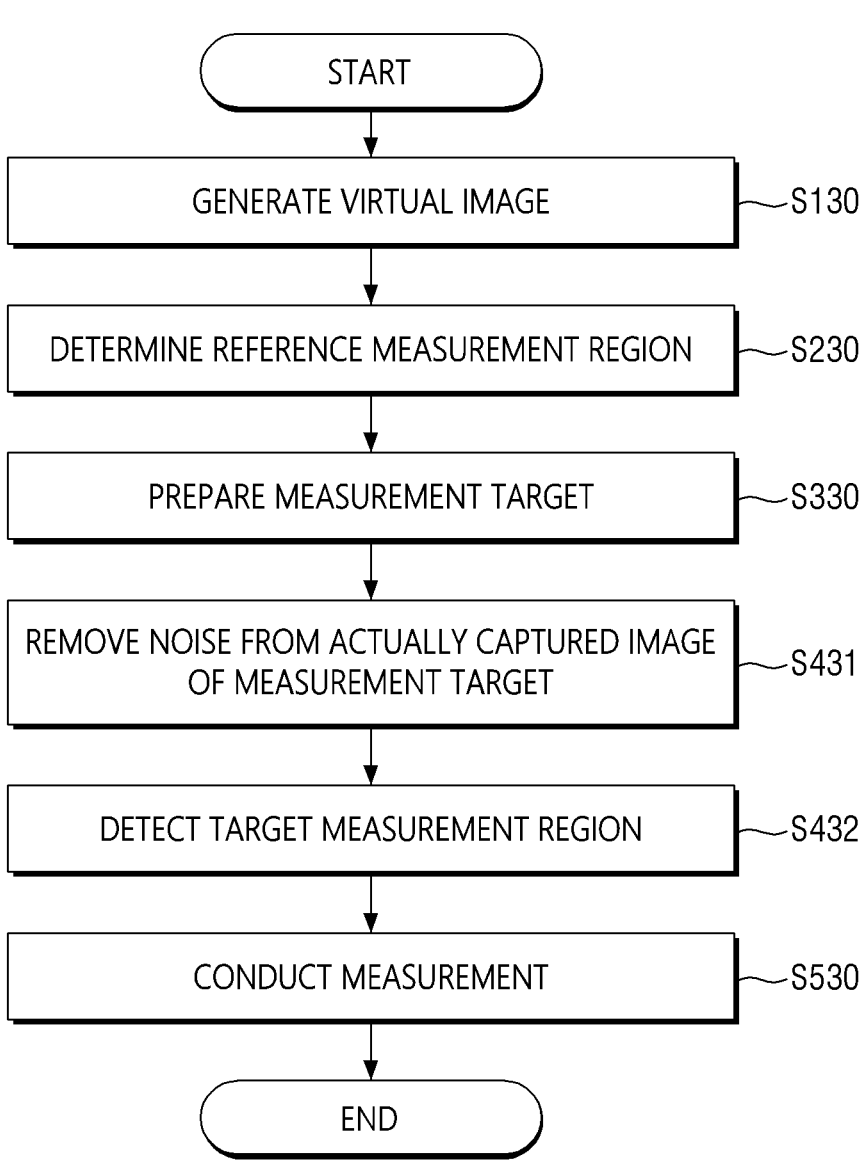
FIG. 8 is a schematic flowchart for illustrating inspection processes according to yet another embodiment of the disclosure.

FIG. 8 is a schematic flowchart for illustrating inspection processes according to yet another embodiment of the disclosure.

Referring to FIG. 8, the virtual image generator 100 may generate a virtual image based on at least one layer showing in a layout drawing (step S130). The layout drawing may include a layout view of each of multiple layers. The virtual image generator 100 may generate virtual images in the order that multiple layers is sequentially stacked. The virtual image may not include texture or style. The virtual image generator 100 of FIG. 8 may omit the preprocessing process (step S121) shown in FIG. 5, and the blurring process (step S129) shown in FIG. 6. Accordingly, the virtual image generator 100 may generate a virtual image that does not include texture or style based on the layout drawing.

The reference measurement region determiner 200 may determine a reference measurement region in the virtual image to measure it (step S230). The reference measurement region determiner 200 may receive multiple virtual images from the virtual image generator 100 and may determine a reference measurement region for each of the multiple virtual images.

A measurement target may include at least one layer patterned based on the layout drawing, and may be prepared for measurement (step S330). The measurement target may be prepared during processes of fabricating an electronic device or semiconductor device.

The target measurement region detector 300 may capture an image of the measurement target and may remove noise from the actually measured image (step S431). For example, the target measurement region detector 300 may partially remove the texture of the actually captured image by primary noise removal and may remove the remaining texture by secondary noise removal. The target measurement region detector 300 may simplify the actually captured image by removing noise from the actually captured image.

The target measurement region detector 300 may detect a target measurement region corresponding to the reference measurement region from the simplified actually captured image (step S432). The target measurement region detector 300 may perform pattern matching of the measurement target based on the reference measurement region, and may detect a target measurement region that satisfies a degree of matching (e.g., a predetermined or selectable degree of matching).

The measurer 400 may measure the target measurement region based on the reference measurement region (step S530). The measurer 400 may measure the size of a line width, the position of a hole, and/or the shape and size of the target measurement region. The measurer 400 may conduct critical dimension measurement based on the reference measurement region. For example, the measurer 400 may conduct pattern measurement on at least one of overlay, refractive index, and thickness based on the reference measurement region to measure the line width, the hole and/or area of the target measurement region. The measurer 400 may measure overlay of the patterns to measure the misalignment of the lines.

The inspection device 10 may acquire virtual images in advance based on the layout drawing, and may eliminate (or may not require) a process of setting a reference measurement region by capturing a real object in which the layers are actually stacked whenever a process proceeds. The inspection device 10 can simplify a process of generating a virtual image by simplifying the actually captured image. Accordingly, the inspection device 10 can save the fabrication cost and time while ensuring reliability.

The above description is an example of technical features of the disclosure, and those skilled in the art to which the disclosure pertains will be able to make various modifications and variations. Thus, the embodiments of the disclosure described above may be implemented separately or in combination with each other.

The embodiments disclosed in the disclosure are intended not to limit the technical spirit of the disclosure but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. An inspection device comprising:
a virtual image generator configured to receive layout data for a plurality of layers and generate a virtual image based on the plurality of layers shown in a layout drawing by integrating the plurality of layers shown in the layout drawing prior to fabrication;
a reference measurement region determiner configured to determine a reference measurement region to be measured in the virtual image;
a target measurement region detector configured to detect a target measurement region corresponding to the reference measurement region from a measurement target including a plurality of layers patterned based on the layout drawing; and
a measurer configured to measure the target measurement region based on the reference measurement region,
wherein the plurality of layers includes at least one metal layer and at least one organic layer.

2. The inspection device of claim 1, wherein the virtual image generator is configured to:
preprocess an image including the plurality of layers shown in the layout drawing to generate a preprocessed image,
capture an image of a plurality of layers stacked based on the layout drawing to acquire an actually captured image, and
generate a first virtual image based on the preprocessed image and the actually captured image.

3. The inspection device of claim 2, wherein the virtual image generator is configured to generate the first virtual image by adjusting a loss of the preprocessed image and a loss of the actually captured image so that a loss of the first virtual image is reduced as expressed in Equation below:

$$L = \alpha L_1 + \beta L_2 \qquad \text{[Equation]}$$

wherein L denotes the loss of the first virtual image, $\alpha$ denotes a weight of the preprocessed image, $L_1$ denotes the loss of the preprocessed image, $\beta$ denotes a weight of the actually captured image, and $L_2$ denotes the loss of the actually captured image.

4. The inspection device of claim 2, wherein the target measurement region detector is configured to detect a target measurement region corresponding to a reference measurement region of the first virtual image from a measurement target in which a photoresist is developed.

5. The inspection device of claim 1, wherein the virtual image generator is configured to:
extract two-dimensional images by separating the plurality of layers shown in the layout drawing from one another, integrate the two-dimensional images to sort the integrated two-dimensional images by types of different overlapping layers, and conduct image mapping on each of the different overlapping layers to generate a second virtual image.

6. The inspection device of claim 5, wherein the virtual image generator is configured to generate the second virtual image by performing the image mapping and then conducting a blurring process for each of the different overlapping layers.

7. The inspection device of claim 5, wherein the target measurement region detector is configured to detect a target measurement region corresponding to a reference measurement region of the second virtual image from a measurement target after the target measurement region has been etched by using a developed photoresist and the developed photoresist has been cleaned.

8. The inspection device of claim 1, wherein the target measurement region detector is configured to perform pattern matching of the measurement target based on the reference measurement region to detect the target measurement region that satisfies a degree of matching.

9. The inspection device of claim 1, wherein the measurer is configured to conduct pattern measurement on at least one of overlay, refractive index, and thickness based on the reference measurement region to measure a line width, a hole, and/or area of the target measurement region.

10. The inspection device of claim 1, wherein the target measurement region detector is configured to:

remove noise from an actually captured image of the measurement target, and detect a target measurement region corresponding to the reference measurement region from the actually captured image after the noise has been removed.

11. An inspection method comprising:

receiving layout data for a plurality of layers and generating a single composite virtual image based on the plurality of layers shown in a layout drawing by integrating the plurality of layers shown in the layout drawing prior to fabrication;

determining a reference measurement region to be measured in the virtual image;

detecting a target measurement region corresponding to the reference measurement region from a measurement target including a plurality of layers patterned based on the layout drawing; and measuring the target measurement region based on the reference measurement region, wherein the plurality of layers includes at least one metal layer and at least one organic layer.

12. The inspection method of claim 11, wherein the generating of the virtual image comprises:

preprocessing an image including the plurality of layers shown in the layout drawing to generate a preprocessed image, capturing an image of a plurality of layers stacked based on the layout drawing to acquire an actually captured image, and generating a first virtual image based on the preprocessed image and the actually captured image.

13. The inspection method of claim 12, wherein the generating of the virtual image comprises generating the first virtual image by adjusting a loss of the preprocessed image and a loss of the actually captured image so that a loss of the first virtual image is reduced as expressed in Equation below:

$$L = \alpha L_1 + \beta L_2 \qquad \text{[Equation]}$$

wherein L denotes the loss of the first virtual image, a denotes a weight of the preprocessed image, $L_1$ denotes the loss of the preprocessed image, $\beta$ denotes a weight of the actually captured image, and $L_2$ denotes the loss of the actually captured image.

14. The inspection method of claim 12, wherein the detecting of the target measurement region comprises detecting a target measurement region corresponding to a reference measurement region of the first virtual image from a measurement target in which a photoresist is developed.

15. The inspection method of claim 11, wherein the generating of the virtual image comprises:

extracting two-dimensional images by separating the plurality of layers shown in the layout drawing from one another, integrating the two-dimensional images to sort the integrated two-dimensional images by types of different overlapping layers, and conducting image mapping on each of the different overlapping layers to generate a second virtual image.

16. The inspection method of claim 15, wherein the generating of the virtual image comprises generating the second virtual image by performing the image mapping and then conducting a blurring process for each of the different overlapping layers.

17. The inspection method of claim 15, wherein the detecting of the target measurement region comprises detecting a target measurement region corresponding to a reference measurement region of the second virtual image from a measurement target after the target measurement region has been etched by using a developed photoresist and the developed photoresist has been cleaned.

18. The inspection method of claim 11, wherein the detecting of the target measurement region comprises performing pattern matching of the measurement target based on the reference measurement region to detect the target measurement region that satisfies a degree of matching.

19. The inspection method of claim 11, wherein the measuring of the target measurement region comprises conducting pattern measurement on at least one of overlay, refractive index, and thickness based on the reference measurement region to measure a line width, a hole, and/or area of the target measurement region.

20. The inspection method of claim 11, wherein the detecting of the target measurement region comprises:

removing noise from an actually captured image of the measurement target, and detecting a target measurement region corresponding to the reference measurement region from the actually captured image after the noise has been removed.

* * * * *